United States Patent [19]

Petz

[11] 4,165,796
[45] Aug. 28, 1979

[54] TRACTOR GUIDANCE SYSTEM

[76] Inventor: David I. Petz, 2630 W. Durham Ferry Rd., Tracy, Calif. 95376

[21] Appl. No.: 765,301

[22] Filed: Feb. 3, 1977

[51] Int. Cl.² ............................................. B62D 5/08
[52] U.S. Cl. ..................................... 180/131; 172/26; 104/244.1
[58] Field of Search ................ 180/131, 79; 280/87.2; 104/244.1; 172/2, 5, 26

[56] References Cited

U.S. PATENT DOCUMENTS

| | | | |
|---|---|---|---|
| 1,760,079 | 5/1930 | Nichol | 104/244.1 |
| 1,950,910 | 3/1934 | Willrodt | 104/244.1 |
| 2,465,660 | 3/1949 | Phillips | 180/79 X |
| 2,925,875 | 2/1960 | Bourdon | 180/131 |
| 3,343,501 | 9/1967 | Banderet | 180/131 X |
| 3,430,723 | 3/1969 | Brooks | 180/79 |
| 3,708,029 | 1/1973 | Sedgfield | 180/79 |
| 3,844,372 | 10/1974 | Neece | 172/26 |

Primary Examiner—John A. Pekar
Attorney, Agent, or Firm—Mark C. Jacobs

[57] ABSTRACT

A guidance system for a tractor including a valve coupled to a source of hydraulic fluid on the tractor and the power steering mechanism of the tractor. A furrow guide is also coupled to the valve for following a preformed furrow and guiding the tractor for digging subsequent furrows. Both the guide and the valve are disposed along the centerline of the tractor. The valve includes means to selectively supply fluid to the power steering mechanism of the tractor and receive fluid therefrom in response to deviations from the centerline of the guide as the guide moves along the furrow. Optionally, means may be provided for digging a perfect furrow to be used as a guide in digging subsequent furrows.

18 Claims, 19 Drawing Figures

TRACTOR GUIDANCE SYSTEM

CROSS-REFERENCE TO A RELATED APPLICATION

In copending application Ser. No. 765,381 filed concurrently with this application, in the name of the same inventor, there is disclosed an apparatus for preparing a guide furrow to be followed by a tractor guidance system such as the one disclosed and claimed in this application. The disclosure of the copending application is incorporated herein by reference.

BACKGROUND OF THE INVENTION

1. Field of the Invention

The invention relates to guidance systems for farm equipment, such as tractors.

2. Description of the Prior Art

Automatic guidance systems for following furrows for crops or the like are well known in the art. Such systems control the movement of the tractor or the like so that correction may be made to the vehicle in response to guide means engaging the furrows. Certain of these systems do not compensate when the guide means comes out of alignment with a previously ploughed furrow, such as U.S. Pat. No. 1,390,419 to Zybach. In U.S. Pat. Nos. 3,537,531 and 3,402,784, although these systems are directed to overcompensation, the power steering system of the vehicle is not controlled. Other systems, such as the system described in U.S. Pat. No. 3,844,372, are quite complicated and rely on a combination of proportioning switches to correct for oversteering and have not been generally successful.

It can be seen that no prior art patent shows a direct hook-up of the guide means to the power steering pumps of the vehicle. Thus, there is no prior art system which allows a tractor or the like to follow accurately a straight line from open field through to harvest in any row crop.

SUMMARY OF THE INVENTION

It is an object of this system to provide a tractor guidance means which cooperates with the power steering system of the tractor to compensate for oversteering or the like.

It is a further object of this invention to provide such a system which includes a guide arm which may extend either forwardly or rearwardly of the front of the tractor, the arm being coupled to valve means which, when the arm moves, correspondingly moves the tractor's steerable wheels.

It is still another object of this invention wherein extremely small movements of the guidance arm correspondingly move the tractor's front wheels.

It is a further object of this invention to provide a vehicle guidance system wherein lifting the guidance arm returns the tractor steering system to normal operation.

It is still another object of this invention to provide an improved valve coupled to both a guidance arm and the power steering system of the vehicle for automatically compensating for oversteering.

It is a further object of this invention to provide an attachment for the tractor which can cut a perfectly formed guide furrow.

These and other objects are preferably accomplished by providing a furrow guide, coupled to a valve for following a furrow and guiding the tractor or for digging subsequent furrows. Both the guide and the valve are disposed along the centerline of the tractor. The valve includes means to selectively supply fluid to the power steering mechanism of the tractor and receive fluid therefrom in response to deviations from the centerline of the guide as the guide moves along the furrow. Optionally, means may be provided for digging an initial perfect furrow to be used as a guide in digging subsequent furrows.

DESCRIPTION OF THE PREFERRED EMBODIMENT

Figure 1:
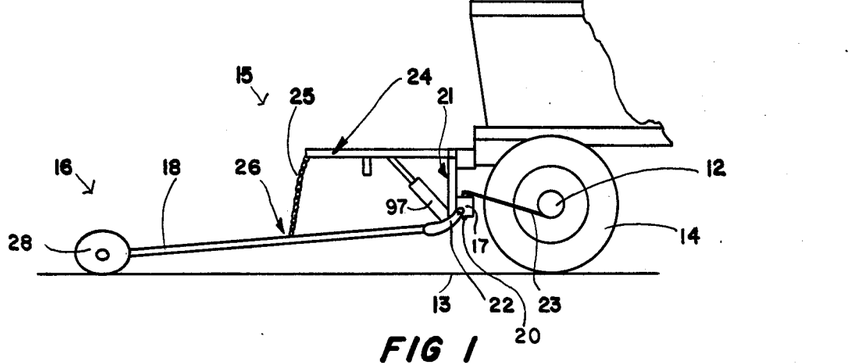
FIG. 1 is a side plan view of a portion of a tractor having the guidance system of this invention mounted thereon.

Referring now to FIG. 1 of the drawing, tractor 10 is provided with a chassis 11 and an axle 12 interconnecting wheels 14 with hydraulic means (not shown) associated with axle 12 for controlling the position of wheels 14 in accordance with the power steering system of tractor 10. As particularly contemplated in the present invention, vehicle guidance means 15 is provided for guiding tractor 10 as it ploughs furrows in a field or the like. In the exemplary embodiment of the invention, such guidance means 15 includes furrow guide means 16 and valve means 17. A guide rod 18 interconnects the furrow guide means 16 to the valve means 17. As will be discussed, valve means 17 is also coupled to the conventional power steering system of the vehicle 10.

Valve means 17 includes a valve body 19 supported on a vertical pivot 20 coupled via member 21 to chassis 11 of vehicle 10 preferably at the centerline of vehicle 10. Valve body 19 also supports a horizontal pivot 22 to which feeler or guidance arm 18 is attached. Arm 18, and of course valve means 17, may be associated with either the front or rear of vehicle 10. That is, guide arm 18 may extend either forwardly or rearwardly from the front of the vehicle.

Valve means 17 also includes a valve control arm 23 coupled via any suitable means to any suitable portion of the tractor 10's front wheel mechanism associated with axle 12. The position shown in FIG. 1 has the valve means 17 aligned with the front wheels relative to the center axis of the tractor 10.

Valve means 17 will be described further hereinbelow. For purposes of the immediate discussion, any suitable valve means having a rotational control action rather than a sliding action may be used. In addition, valve means 17 is ported internally in such a way that the flow of oil therethrough begins as the rotating action of the valve starts. That is, there is no free movement of the rotating mechanism of the valve means in either direction from center (or neutral) without flow of oil beginning to the desired functions. The flow of oil increases with the rotation of the valve means from neutral through and to the full flow position in either direction from neutral.

A bracket 24, which may be hydraulically actuated from the tractor, is pivotally connected (on a horizontal pivot) to chassis 11 and a flexible connection, such as a chain 25 or the like, is coupled to the distal end of bracket 24 and at a selectable point 26 on arm 18. Bracket 24 may be controlled via suitable means (not shown) on tractor 10 to lift feeler arm 18 out of engagement with the ground when deemed necessary by the tractor operator.

As is conventional, tractors have three-way external valves for conventional operation of the tractor. The valve means 17 may be coupled to either of these external valves by suitable fluid conduits. In one position, the external valve will apply hydraulic fluid, such as oil, to the valve means 17 to operate the same and return such fluid for lowering guide arm 18. In the other position of the tractor, the selected external valve will provide fluid to valve means 17 to raise the guide arm 17 and seal off the valve means 17 from the conventional tractor steering system. Of course, if desired, valve means 17 may be actuated by an auxiliary fluid or oil supply coupled to an auxiliary control valve, either manually or electrically operated, on the tractor 10.

Figure 2:
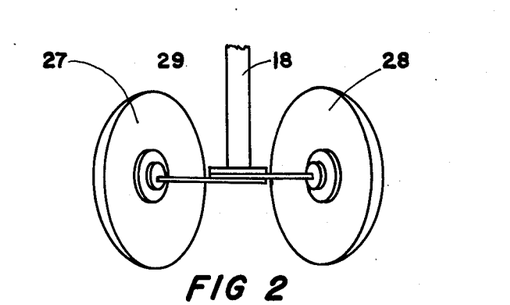
FIG. 2 is a top plan view of a portion of the guide arm and guide discs of the guidance system of the invention.

FIG. 2 shows the furrow guide discs 27, 28 coupled to guide arm 18 which forms part of guide means 16. A support bracket 29 is welded or otherwise secured to the distal end of guide arm 18. A pair of guide disc supporting arms 30, 31 are coupled to discs 27, 28, respectively. These arms 30, 31 may be adjustably mounted to bracket 29, as by suitable bolts 3 in suitable apertures in bracket 29 and guide arms 30, 31, to provide for lateral adjustment. The distal ends of arms 30, 31 are mounted to discs 27, 28 to provide rotation of discs 27, 28. Further details concerning guide arm 18 are recited hereinafter.

Figure 3:
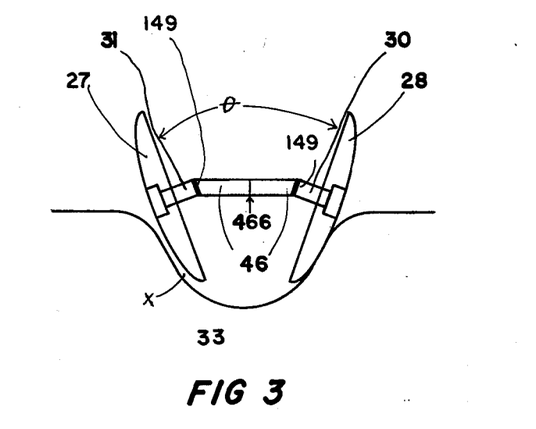
FIG. 3 is an end view of the guide arm and discs of FIG. 2 as they engage a furrow.
Figure 4:
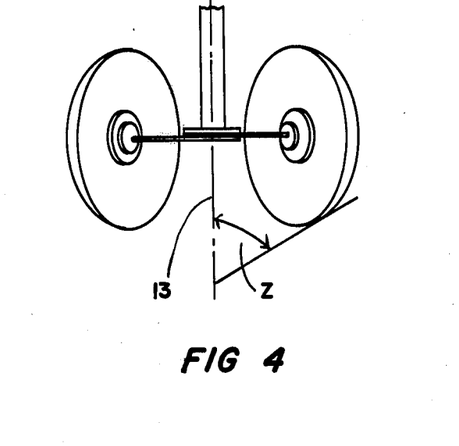
FIG. 4 is a top view of the guide arm, discs and furrow of FIG. 3.
Figure 5:
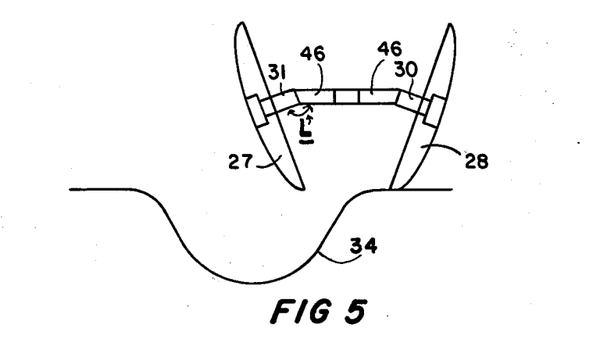
FIG. 5 is a view similar to FIG. 3 showing an alternate position of the guide arm and discs.

In FIGS. 3 through 5, various operating positions of guide discs 27, 28 are shown. In FIG. 3, an end view of furrow 33, furrow 33 is generally convex and it can be seen that discs 27, 28 conform generally to the curved sides of furrow 33 and ride along this area. FIG. 4 is a top view of the furrow 33 of FIG. 3, the top angle of the discs 27, 28 not being critical, showing guide arm 18 partly out of the angle of movement. FIG. 5 is an end view of a furrow 34 showing the guide discs 27, 28 completely out of furrow 34.

Discs 27, 28 are preferably spherical and, as discussed, mounted to support arms 30, 31 to accomplish several functions. In FIG. 3, discs 27, 28 are mounted with their flat planes so far off from the vertical that the load of guide arm 18 is supported by the spherical area of discs 27, 28 thereby allowing discs 27, 28 to carry better the load of guide arm 18 in loosely formed furrows without pushing dirt or damaging the shape of the beds. Note point X in FIG. 3 wherein the edge of the disc 27 does not touch the furrow 33. As discussed, discs 27, 28 may be adjusted laterally to enable them to be adjusted to furrows of differing widths and contours.

In FIG. 3, the plane of discs 27, 28 is at an angle to the centerline running through the center of tractor 10. This angle is greater than the angle of the guide arm 18 from this centerline 13 should the discs 27, 28 bounce out of the furrow as shown in FIG. 5.

Figure 6:
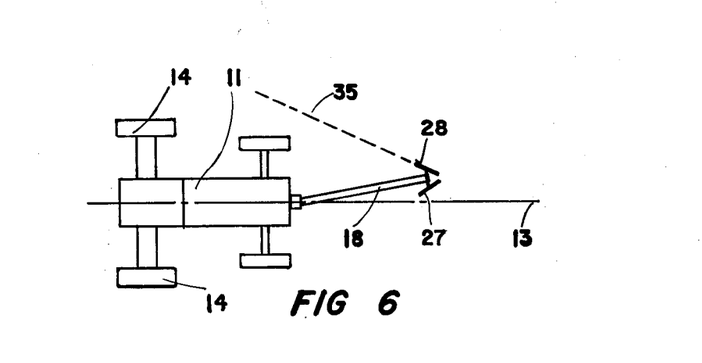
FIG. 6 is a top plan diagrammatic view illustrating one feature of the guidance system of the invention.

FIG. 6 shows another important feature of the discs 27, 28 and the guide means 16. Note that guide arm 18 is off center from the centerline of chassis 11.

However, disc 28 is angled such that line 35, passing through the plane of rotation of disc 28, intersects the centerline. Disc 28, in this position, is now the principal support of arm 18 as shown in FIG. 5. Thus this disc 28 will rotate in a plane of rotation back into the furrow 34, to realign arm 18 back along the centerline. Thus, the joint action of the two planes of rotation of 27 and 28 cancel each other such that a direct forward motion is achieved.

Figure 7:
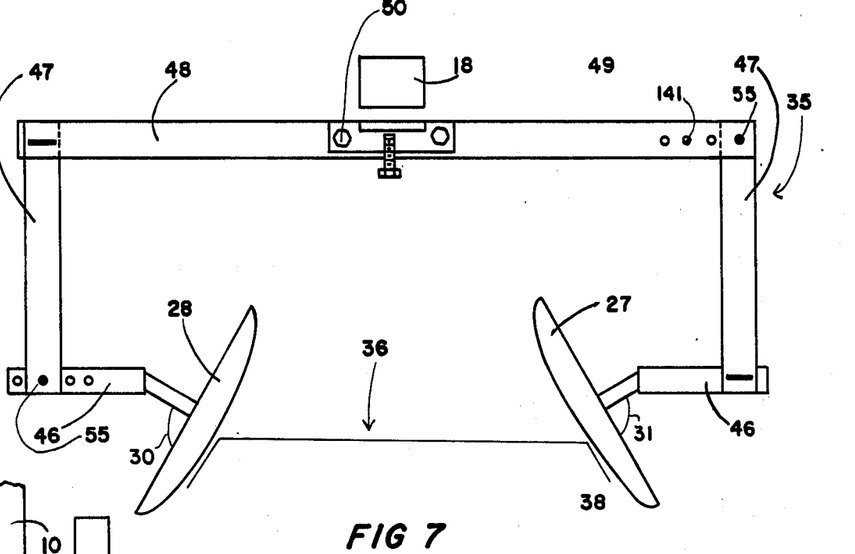
FIG. 7 is an end view similar to FIG. 3 showing an alternate position of the guide discs on a differently contoured furrow; said guides being mounted on a U-frame.

It is further seen that no criticality is to be attached to the angle $\theta$ of FIG. 3, that is the angle of inclination of the two discs 27 and 28, here and in the embodiment of FIG. 7.

It is seen that angle Z as shown in FIG. 4 which is formed between centerline of tractor plane of rotation 13 and the mounted discs 27 and 28, must be the same and must be sufficient enough to intercept the centerline 13 when arm 18 is displaced from the centerline. Therefore, the geometric relationship of the mounting of the guide discs 27 and 28 with respect to each other, ie. angle $\theta$, and with respect to the centerline 13, explains way the guide discs must return to the furrow if it has been displaced therefrom as shown in FIG. 5.

If the furrow has been previously tilled, such that plants are now growing in the furrow, and the operator desires to carry out a tilling operation on such furrow, then the guide means should be operated with the guide discs 27 & 28 arranged according to the manner set forth in FIG. 7 as now to be discussed.

Guide discs 27 and 28 are removed from their mounting and attached to frame 35. Frame 35 is seen to comprise two spaced apart in the same horizontal plane axle mounts 46, secured to each of which is a vertically upwardly depending connector 47, each connector 47 being joined to the other at the upper end thereof by brace 48, which is secured at its terminals to each connector 47 at a right angle thereto, and substantially parallel to the two inward depending axle mounts 46. Each of the connections between 46,47 and 48 aforesaid may be by welding, braising, or preferably bolting of the bar stock used for same.

Figure 18:
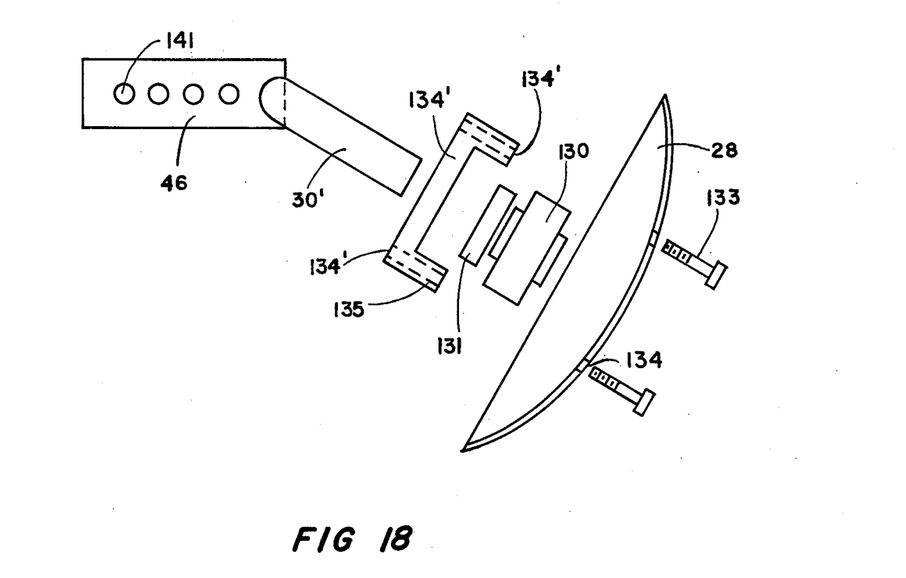
FIG. 18 is an exploded close up side view, but sectional through the guide discs, showing the mode of mounting of the guide discs to their axles as seen in FIG. 7.

If bolting is employed, which is preferred, then a series of spaced apart apertures, 141 in the parallel horizontal planes, one in the two parts 46, one row in the part 48, should be employed such that members 47 can be laterally adjusted, thereby altering the distance between the two spaced apart axle mounts 46. The desired result can take place by having 47 secured by the bolt 55 to 48, as aforesaid with 46 being rigidly secured to 47, or 47 can be rigidly secured by welding or braising with 46 bolted twice to 47 for lateral inward adjustment. Obviously, FIG. 7 represents a composite of the two methods of achieving adjustability of 46 inwardly with 47 being rigidly secured to 48 on the left and 46 adjustable on that side; and on the right, 47 is adjustable with 46 rigidly affixed. It is within the scope of the invention also to have two parallel rows of apertures and to have all of 46 and 47 boltable if desired. Mounted on the front of brace 48, at its midpoint is yoke 49. Yoke 49 is secured by bolts 50 to brace 48, for connection to guide arm 18, by additional bolts 50, through suitable apertures in yoke 49, not shown. Discs 27 and 28, which are crossed from the right side to the left side and vice versa, without rotating of the discs 180°, are mounted with 28 on the left, (28 being on the right in FIG. 3) and 27 being on the left on axle 46 by the same means employed for securing the discs 27,28 as shown without the details thereof in FIGS. 3,4, and 5. Discs 27 and 28 are secured to their respective axles 46 by being secured in the manner set forth as follows to a pair of guide disc supporting arms 30' and 31'. Structurally parts 30' and 31' are the same as parts 31 and 30 of FIG. 3; they are given prime numbers in view of their different angular orientation in FIG. 7. Reference should now be made to FIG. 18 for the details of the mounting of the guide discs 27 and 28 for the configuration of FIG. 7. The slight modification of 30 and 31, with respect to the mounting of same will also be discussed below.

Reference is now made to FIG. 18. Since the mounting of guide discs 27 and 28 is achieved in the same fashion, the discussion will be limited solely to the mounting of 28. Guide disc support arm 30' is rigidly secured at the terminal end of 46, not secured to connector 47. 30' depends vertically at about a 20° angle from the horizontal. Bearing retainer 132 is secured to disc 28 on the concave side thereof by bolts 133 passing through apertures 134 in said disc and correspondingly suitably aligned apertures 134' in the retainer 132's circular raised portion 135 & secured by nuts not shown. Wedgingly interposed between said retainer and said disc is bearing 130. Lock collar 131 of bearing 130 is positioned within the central portion of bearing retainer 132 and is held within same by the circular raised portion 135 of said retainer 132. The inner race of bearing 130 is mounted through the central opening of bearing retainer 132 and is rigidly secured to guide disc supporting arm 30'. The bearing retainer 132 is seen to be rotatingly fitted upon said guide disc supporting arm such that movement of disc 28 will in turn cause the outer race of bearing 130 and bearing retainer 132 to move at the same time.

It is to be seen that while the details of the mounting of guide discs 27 and 28 are not shown in FIGS. 3, 4, and 5, it is to be understood that the same relationships are employed such that the disc is secured to bearing retainer 132 with the bearing 130 interposed therebetween, said bearing 130 having its inner face fixedly secured to guide disc supporting arm 30. Whereas in FIG. 7 the bolts are inserted on the convex side of the disc into bearing retainer 132, the bolts are inserted also on the convex side in FIGS. 2, 3, 4, and 5 but with a reversal of the position of the discs 27 and 28 as discussed above.

Turning back now momentarily to FIG. 3. Whereas in FIG. 18 the end of axle 46 not secured to guide disc supporting arm 30' is connected to connector 47 as described aforesaid, here in FIG. 3, the two parts 46 are butt welded to each other as shown by seam 466. As is seen clearly in FIG. 18, axle 46 has a series of spaced apart holes therein along the midline of the length of said axle 46. Guide arm 18 is secured in the embodiment of FIGS. 3, 4 and 5 by a pair of 148 bolts through a pair of suitably alligned holes in 18 that are spaced apart to correspond with the spacing of the openings in 46, and secured in place by nuts 148', not shown. Guide disc supporting arms 30 and 31 are adjustably secured preferably, as by hinge means 149, to axle 46 on one thereof. If a non-adjustable mounting of 31 and 30 to 46 is carried out as by welding, then angle L as shown in FIG. 5 is not alterable, and the operator may have reason to want to alter the angle θ of FIG. 3, which is best accomplished by altering angle L of FIG. 5.

The guidance system of my invention may be used on a field without preformed furrows or planted crops. It is necessary for the operator to mark the position the tractor 10 should stay in succeeding passes through the field. In the past, this was done by any suitable means visible to the operator. However, with guidance systems as in the instant invention, the guide means must follow a furrow or change in contour. It is imperative that the guide furrow be continuous i.e., without any interruptions, as these might force the guide means to leave the furrow, thus disrupting the proper operation of the tractor 10. The problem is complicated by the fact that the guide furrow must be engaged by an extended appendage from the tractor 10 making it almost impossible to drag a furrow sufficiently by conventional means.

Figure 8:
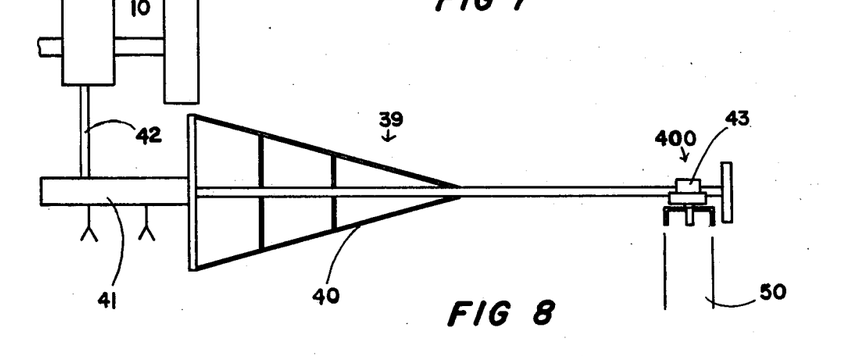
FIG. 8 is a top plan view of an accessory unit employable on the tractor on which the instant guidance system is attached, and said accessory is intended to create the guide furrow.

Thus, in FIG. 8 as particularly contemplated in the present invention, means 39 are provided for constructing a guide furrow. Tractor 10 is shown in top plan view in FIG. 8 towing a digging implement 40. This digging implement 40 includes a frame 41 coupled to tractor 10 by a bracket 42. A motorized cutting head 400, preferably hydraulic, is mounted on the distal end of the superstructure (digging implement) of furrow construction means 39. This cutting head 400 has its teeth rotating normal to the path of movement of the tractor. Details of such a furrow constructing attachment are set forth in my copending application Ser. No. 765,381, filed concurrently and incorporated by reference here.

It is seen, as will be discussed in the copending application aforesaid, that frame 41, rather than being a newly created part for use with the perfect furrow constructing means 39, may comprise the tractor tool implement bar that preexists, and is employed by the operator of the tractor for the attachment of other tools.

On the first pass with means 39, a standard furrow is cut. The cutting teeth, moving at about 500 RPM, make multiple ground entries, and this may be required due to the nature of the soil, the existence of waste material from prior crops, changes in contour and the like. In addition, multiple tooth entries help break down large clods of dirt which could interfere with the guidance system 15 of this invention.

As has been indicated previously, the perfect furrow may be created by use of means 39 or by some other device known to the art and not disclosed herein. In any event once a perfect guide furrow has been dug, the guidance means 15 as disclosed herein is used to follow the perfect furrow with suitable furrow cutting means towed by the tractor 10 and keyed to the guide means 16. In this manner, perfectly spaced apart furrows may be cut. If the perfect furrow dug as in FIG. 8 forms an arc, such as around a tree or other obstruction, each succeeding pass of the tractor will be uniformly spaced apart from the obstruction in a series of succeeding arcs that terminate back into straight lines as the land evens out. Of course, the guidance means of my invention can follow a preestablished furrow but, since some land may not be properly tilled, it may be necessary to cut the guide furrow as discussed with regard to FIG. 8.

As the discs 27, 28 ride in the preceding guide furrow, it controls the valve means 17 which in turn controls the wheels 14 of tractor 10. The tractor 10 will always center itself in accordance with guide means 16.

As discussed previously, the fluid or oil used to operate valve means 17 may be taken off of the conventional source of fluid at the tractor 10 or by providing an indepandant source, such as oil and a reservoir. In fact, a suitable valve may be provided on tractor 10 tied in with both the conventional tractor operating system and valve means 17.

Perfectly parallel rows can be cut using the guidance system of my invention. Parallel rows are of the utmost importance or else the tilled area may have untilled sections, or furrows too close together to cultivate, or too wide to get at weeds or the like.

Figure 10:
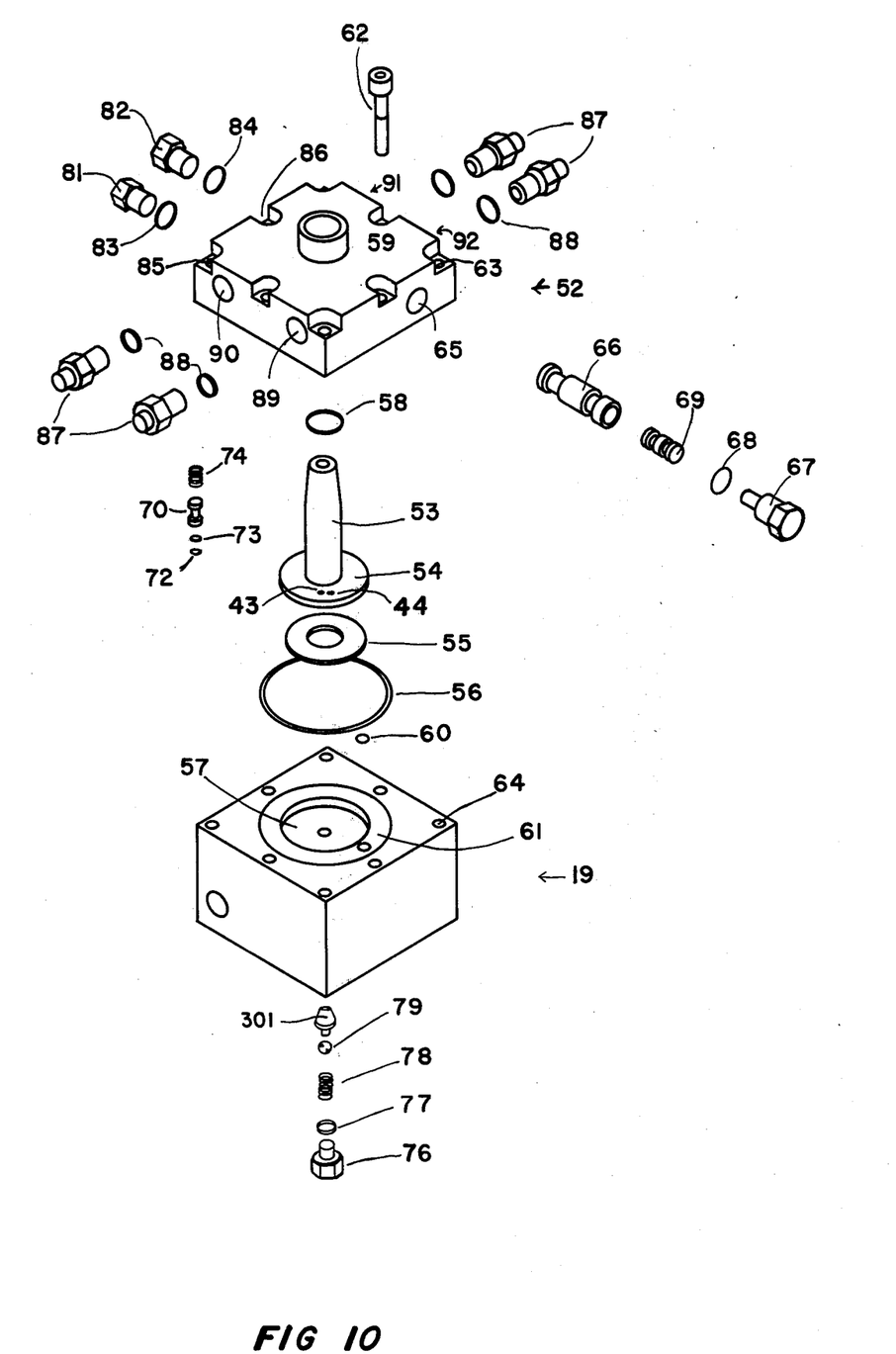
FIG. 10 is an exploded view of the valve means alone of the guidance system of this invention.

Referring now to FIG. 10, an exploded view of a preferred valve means 17 is shown. Valve means 17 includes main body 19 closed off at the top by a cover plate 52. The boss 59 on the top of 52 and the bottom of 19 supports bearings by which valve 17 is mounted to member 21, providing vertical pivot. Shaft 53 has a flange plate 54 at its lower end adapted to engage a needle thrust bearing 55. O-ring 56 is inserted between chamber 57 in main body portion 19 with bearing 55 then placed in chamber 57 with flange 54 of rotor and shaft 53 abutting thereagainst. A seal ring 58 is placed in the top 52 for shaft 53 with an orifice valve (to be discussed) and cover 52 is placed on top of main body portion 19 with shaft 53 extending through the apertured body 59 (boss) therein. An O-ring 60 is provided for aperture 61 in main body portion 19. Suitable screw socket heads 62 are provided for engaging apertures 63, 64 in cover plate 52 and main body portion 19 for securing the same.

Cover plate 52 has a suitable aperture 65 for receiving therein a conventional spool valve 66. A limited travel plug 67, receiving O-ring 68 and a spool return spring 69 thereon, enters spool valve 66 and is threaded in aperture 65 to retain the same therein.

As discussed, a conventional orifice valve 70 is also provided, including O-ring 72 and back-up ring 73 between valve 54 and cover plate 52. Spring 74 pushes on valve 70. The upper side of 54 abuts against valve 70 and holds orifice valve 70 in position. A threaded hose fitting 76 receives O-ring 77, spring 78 and a conventional ball check valve 79 and retains the same in aperture 80 in main body portion 19.

Threaded plugs 81 and 82 receive O-rings 83 and 84, respectively, and close off apertures 85 and 86, respectively, in main body portion 19. Four threaded hose fittings 87 receive O-rings 88 therein and are threaded in apertures 89 through 92, respectively 89 aperture leads to 98, shown in FIG. 11.

Figure 11:
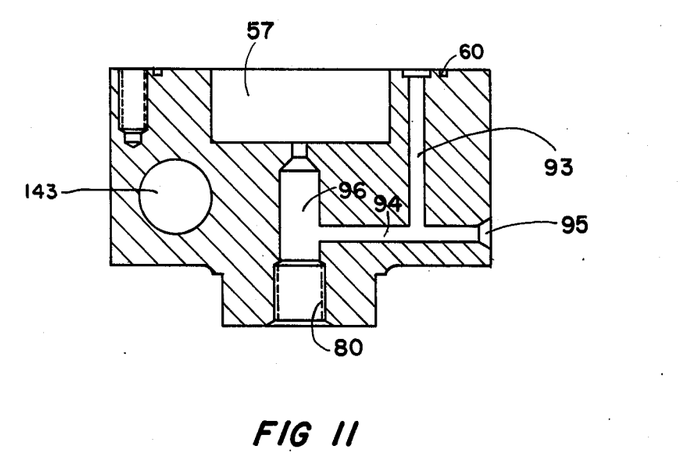
FIGS. 11 and 12 are vertical cross-sectional views of both portions of the valve means of FIG. 10.

Main body portion 19 is shown in cross-sectional view in FIG. 11. O-ring 60 is inserted at the top of passageway 93. Transverse passageway 94 is closed off by plug 95 and communicates with both passageways 93 and chamber 96 closed at one end by ball valve means 79 and opening into chamber 57 which receives valve rotor and shaft 53.

Figure 12:
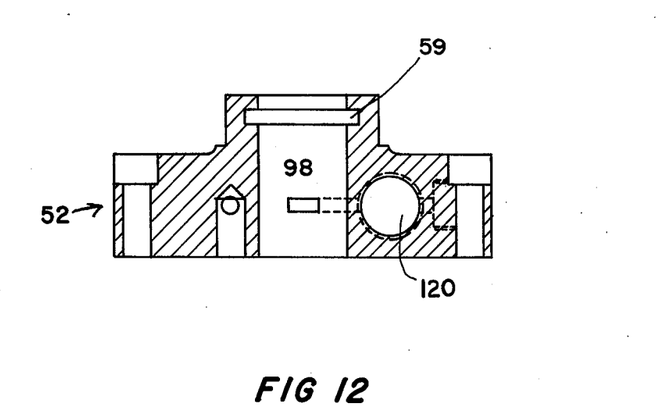

Cover plate 52 is shown in cross-section in FIG. 12. The boss 59 permits the valve means 17 to be mounted on its vertical pivot 20 to member 21. Opening 143 in body portion 57 (FIG. 11) permits the valve means 17 to be mounted to guide arm 18 on its horizontal pivot 22.

Figure 13:
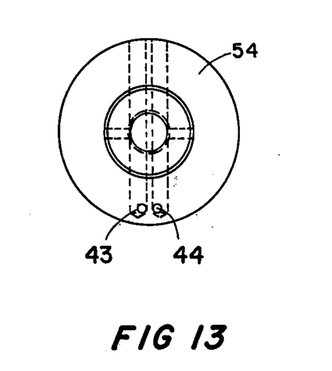
FIG. 13 is a view of a valve rotor and shaft alone as depicted in the valve means of FIG. 10.
Figure 14:
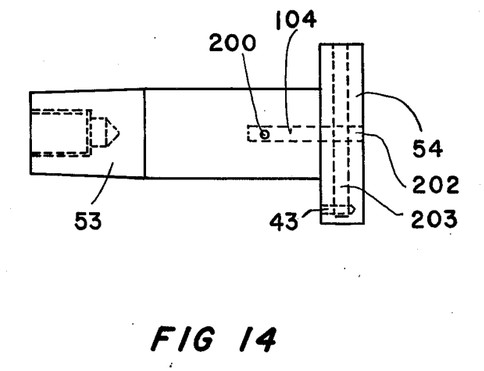
FIG. 14 is a view taken along the lines XIV—XIV of FIG. 13.

FIGS. 13 and 14 are views of the rotor valve and shaft 53 alone. As can be seen in FIG. 13, aperture 200 is formed in valve stem 53. Another aperture, not visible, 200' is formed approximately 180° apart. In flange 54, as also seen in FIG. 14, passageways 202 and 203 are formed therein. Thus, apertures 200 provide fluid communication when valve and shaft 53 is rotated. When centered along the centerline of tractor 10,13, passageways 202 and 203 are closed off on each side of the communicating fluid passageway in valve means 17. As valve and shaft 53 rotates when guide arm 18 moves off of center, in either direction, fluid communication is provided via 17 through 202 and 203 to aperture 200.

Figure 15:
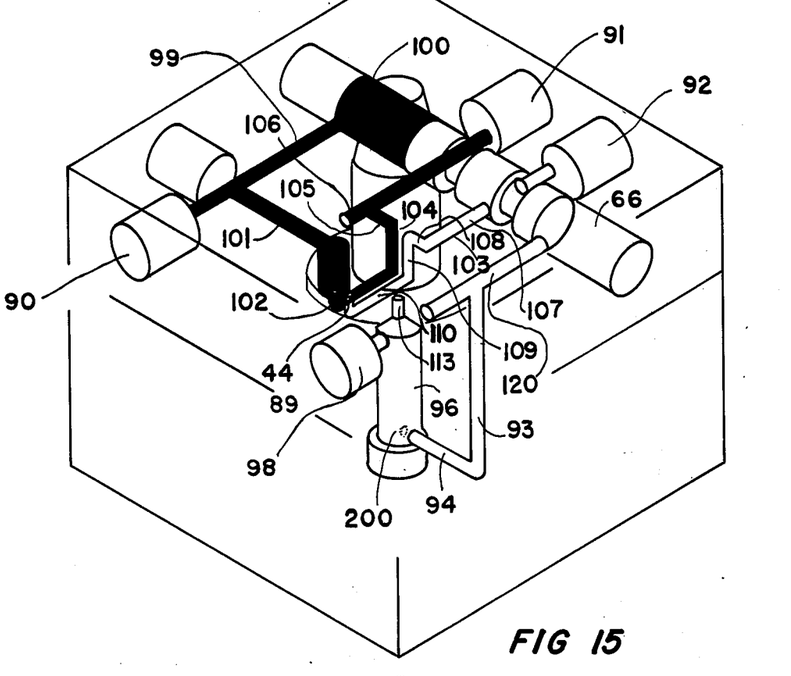
FIGS. 15 through 17 are assembled views of the valve means of FIG. 10 and each illustrates a particular stage of the flow of fluid through the valve.
Figure 16:
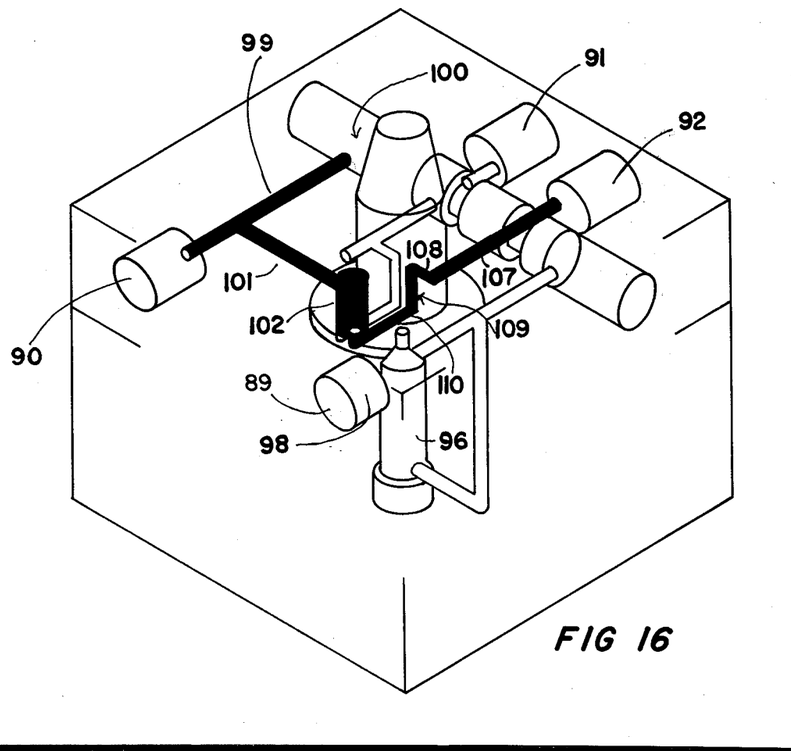
Figure 17:
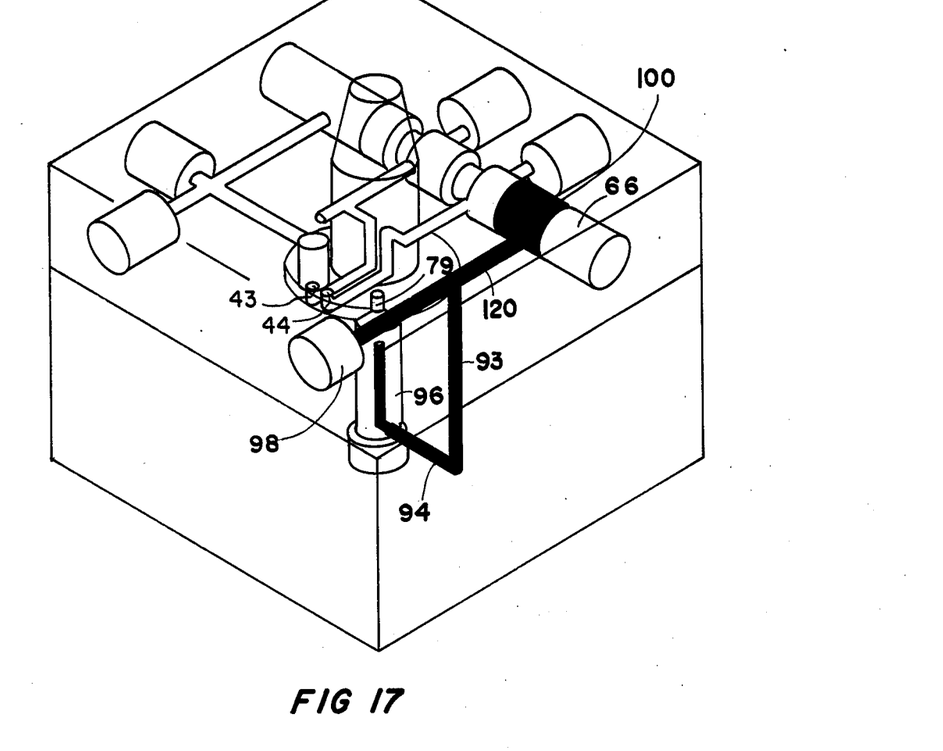

FIGS. 15 through 17 illustrate the flow of fluid through the valve means 17 to provide the desired system directions. In FIG. 15, fluid from the preexisting system of fluid supply on the tractor 10, (or from an added source of fluid as discussed) enters inlet 90 and passes through passageway 99 and enters passageway 100 thereby pushing spool valve 66 to the open position. Incoming fluid flows through passageway 101 and goes through passageway 102, orifice valve 70, port 43, passages 103, 104, 105, through hole 200 to passage 106 and then exits out of port 91 to 137, the conventional power steering assembly of tractor 10.

In this same FIG. 15, fluid from the power steering assembly enters port 92 and passes through passageways 107,200', 108, 109, 110, and out port 44 which is not covered by 70 when in this mode, then through the chamber 57 via 113, past check ball 79, passage 96, out passageways 94 and 93, then 120 and through port 98. Spool valve 66 is in the open position.

Turning now to FIG. 16, it is seen that fluid enters port 90, passageway 99 and divides into 100 and 101. The portion in 101 flows through 102, orifice valve 70, to port 44, then through passageways 110, 109, 108, 200', 107 and exits out of port 92 to actuate the power steering system in the opposite direction. As to the portion of fluid diverted to 100, it pressurizes the spool valve 66, forcing the spool to stop a member, not shown here which is plug 67 of FIG. 10, and the flow is prevented from going further.

Referring now to FIG. 17, spool valve 66 is closed by the oil pressure that is used to lift guide arm 18, and at the same time blocking the flow through both ports 91 & 92. Check valve 79, shown only in this Figure, stops the flow of fluid through the rotor and shaft 53. Fluid remaining in passageway 100 that is displaced by movement of 66 as the spool 66 moves to the closed position & exits port 90. The flow from 120 through 93,94,96 is stopped by check ball 79, when plug 76 is employed. However, when the FIG. 9 restrictor 300 is employed, the oil flows through 300 as discussed elsewhere herein.

When the oil exiting 301 passes through 76' it terminates in the cylinder 97, not shown, used to raise the arm 18. Obviously, when the oil is used to lower arm 18, oil flows from cylinder 97 past restrictor 300 in reverse fashion, and transpires during flow as shown in FIGS. 15 or 16. The source of this oil is the same source of supply oil brought to 90.

In this Figure, the spool valve 66 is closed, and all of the ports are closed so no flow can take place through 91 or 92.

It is seen from the Figures that feedback from the wheels of the tractor 10, by tie rod 23 arm to rotor 53 enables the power steering system to sense the relationship, directionally speaking, of the wheels of the tractor to the guide means, 16. The wheels turn in relation to how far off center the wheels of the tractor 10 is to the guide arm 18. Thus as the guide means 16 turns the valve body 17, thereby causing oil to flow to the steering, and causing the the tractor wheels to move in a specified direction, the tie rod arm 23 senses the position of the wheels of the tractor causing the shaft 53 to go the same direction as the valve means 17, such that the flow of oil is stopped when the wheels are positioned with the guide means 16.

The linking arms 136 attached to tie rod arm 23 may be disproportional in length to allow the tractor wheels to turn a greater degree than valve 17 to permit faster centering of tractor 10 over guide 16. Valve 53 is mounted directly on the vertical pivot point of valve means 17, which is coupled via tie arm 23 to steering spindle 12 (FIG. 1). Thus the entire system is in equilibrium. The more the guide means 16 is moved over, due to ports 43 or 44 in valve 53 opening and closing as valve 53 is rotated, the further the wheels 14 turn. As tractor 10 approaches center, the wheels 14 straighten out. They never cross over the centerline. As the guide means 16 moves either right or left, fluid (i.e., oil) leaks to the power steering mechanism so that fluid flows through to power steering mechanism so that it moves in the same direction. Any time the guide means 16 gets to the right of the tractor 10, the tractor 10 turns right until it centers itself back over guide means 16. The further guide means 16 is off, the further wheels 14 turn.

Since there is no movement of valve 17 in one direction or the other without commencing fluid flow in one direction or the other, there is no flow. Thus, there is no play in the valve of the invention. The spacing of the ports of the valve means 17 is selected and the centering of valve 53 is selected so that any rotation of valve 53 will feed fluid or oil to one port or the other.

Figure 19:
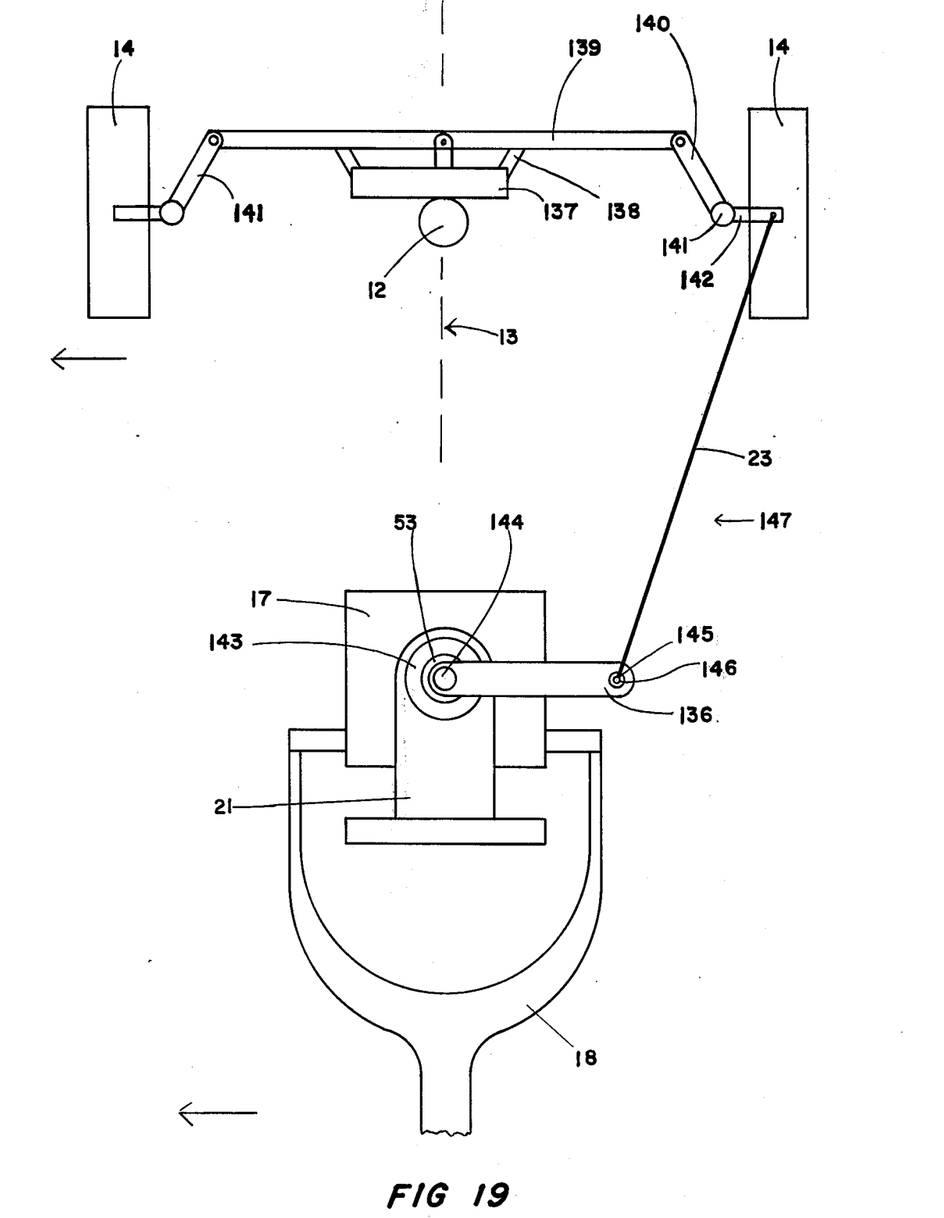
FIG. 19 is a top plan view illustrating the feedback sensing mechanism forming a part of this invention.

Turning now the mechanics of movement related to the operation of the means 17, reference is made to FIG. 19. Here guide 18 has pivoted thereon horizontally at 22, guide valve means 17, shown secured to valve 17 by bearing 143 and 143', not shown, at the top and bottom of valve 17 respectively. Sensing feedback mechanism 147 is seen to comprise the interconnection of parts 136, 23 and 142 as described below. Linking arm 136 is rotatably secured to the shaft 53 of valve means 17 as by bolt 144 or a press fit as known to the art on one end. Linking arm 136 is also rotatably secured to tie rod arm 23 by suitable bolts 145 through apertures 146 in said arm 136 at its opposite end.

Tie rod arm 23 is rotatably connected to connecting arm 142 by suitably bolting means 145' at the end not linked to 136. Parts 136 and 142 may be fabricated from bar stock of steel or aluminum, while 23 may be the same or of piping.

The interconnection of spindle 141, to spindle arm 140 and in turn to tie rod 139 are all conventional and are found in many tractors, and as such no further discussion on these prior known items will be set forth. Likewise, the attachment of power steering mechanism 137 via steering connectors 138 to said tie rod 139 is deemed conventional and known to the art.

It is seen that the connecting arm 142 portion of sensing feedback mechanism 147 may be attached to any of the 3 vertical spindles depicted in this Figure. These spindles are denoted as 141,141' or central spindle 12. In the embodiment shown in FIG. 1, the connecting arm 42 is attached to the central spindle 12.

Therefore, to recapitulate upon the movement of the guidance means 15 relative to the movement of the tractor wheels 14, it is seen from FIG. 19 that as guide arm or rod 18 moves in the direction of (arrow F) the valve body 19 rotates in the same direction, thereby causing oil to flow in hydraulic steering system 137 since valve means 17 is hydraulically connected to 137, though this is not shown in FIG. 19, such that the tractor wheels 14 turn toward the direction of arrow G. The turning motion of the wheels 14 is sensed by the connector arm 142 no matter which spindle 141 is fixedly connected to, thereby moving guide rod 23 which in turn moves linking arm 36 thereby rotating shaft 53 to center, i.e. neutralizing the valve 17 with respect to the angle formed by the movement in the direction F with respect to the centerline 13. In like manner, the wheels 14 are moved in a predetermined ratio to the movement of arm 18 also in the direction of arrow F. The ratio of the length of 136 to the length of 142 governs the angular movement of the wheels relative to the angular movement of guide arm 18.

It can be seen that I have described a guidance system for a tractor for following a straight line which can be cut initially as discussed above or follow a preexisting furrow. The tractor hydraulic system is coupled via valve means to the tractor power steering system. Guide means hinged to the tractor is also coupled to the valve means. When the arm 18 thereof moves, the tractor steering wheels move. The discs 27, 28 follow the guide furrow which in turn guides the tractor. As little as ⅛ inch movement of arm 18 moves the wheels. When arm 18 is lifted, tractor steering is again controlled by the operator by way of the power steering mechanism built into the tractor. The basis for this is the fact that when arm 18 is raised, spool valve 66 is turned to a closed position as per FIG. 17, such that no flow of fluid takes place in valve means 17, thereby isolating the guidance system 15 from the operation of the steering mechanism of the tractor.

In certain situations it may be deemed beneficial by the tractor or other vehicle's operator to employ the guidance system of this invention mounted on the front of the prime mover, but positioned for operation in closer proximity to the work implement. That is to say, the guide system is mounted on the front of the vehicle but extends rearwardly therefrom and operates in most instances beneath the tractor and in others, between the tractor and the attached implement. It is deemed beneficial to employ such a rearward mounted guidance system in those instances where the operator desires to have the guidance means in closer proximity to the working implement. The prime reason for having same, would be those situations where the furrow to be followed by the guide system was installed by a means other than the guide system of this invention. If such took place such that the rows were not parallel or were not configured for easy following by the guide arm, it would be seen that the cultivator or other implement trailing the tractor would tend not to follow the guide path as close as might be desired. Possibly, if such took place, plants could be uprooted or damaged if pre-existent along the guide furrow. Thus it is seen that by rearwardly locating the guide sensing portion, i.e. arm 18 and discs 27 and 28, the response of the tractor will be responsive in its vertical axis to lateral movement of the guide means. Whereas when the guide means is situated forward to the tractor, a horizontal or linear response along the centerline of the tractor will occur. The advantage of having the rearward mounting of the guide arm and discs is that they would be in closer proximity to the work implement. It has already been indicated that lateral movement of the guide arm 18 will cause movement of valve body 19 a predetermined corresponding amount, which amount is relative to the length of arm 18. It is also seen that the lateral movement of guide arm 18 directly influences the movement of the tractor wheels 14 laterally. This movement is also directly related to the length of guide arm 18. When the guide arm 18 is mounted forwardly, the translation of a fixed amount of lateral movement by the guide discs 27 and 28 is significantly reduced or dampened by the time that lateral movement is translated to the movement of the tractor wheels 14. Indeed, the rear wheels would be dampened even more. Thus, a two inch lateral movement of the guide discs 27 and 28 might for a predetermined arm length 18 cause the tractor wheels 14 to move laterally about ¼" or some other arbitrary amount less than the 2" of lateral movement of the guide discs 27 and 28. However, when the guide means 16 is rearwardly mounted, it is seen that the rear wheels of the tractor, and not the front wheels, will move in closer proximity to the amount of lateral movement of the discs 27 and 28. It is seen that the movement of the rear wheels closer approximates a 1 to 1 relationship of the amount of lateral movement of the disc 27 and 28 to the lateral movement that will take place at the rear wheels of the tractor. That is to say, the dampening effect is lost.

Figure 9:
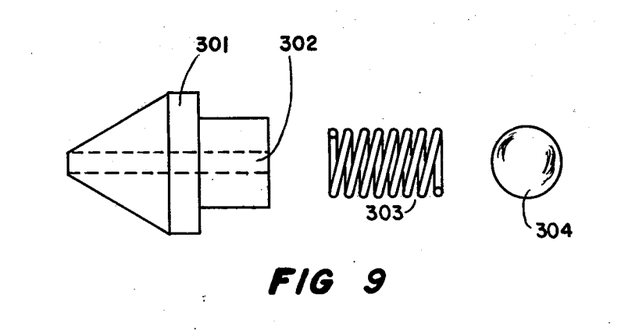
FIG. 9 is a perspective view of a modified embodiment of a part of the valve of FIG. 10.

In FIG. 9 there is shown a preferred embodiment for a flow restrictor 300 which is a check valve 301 with a passage 302 therethrough. Part 301 seats on a 90° or straight fitting, not shown, as a replacement for the plug 76 of FIG. 10. This fitting is used for the hose going to the cylinder. Flow restrictor 300 is seen to have associated therewith spring 303 and check ball 304 as in FIG. 10. The spring holds the check valve on the seat in the raising position allowing oil only to flow through the drilled orifice 302 thereby restricting the flow. The device also permits full flow in the lowering position. In this latter position the restrictor comes off the seat and full flow is permitted. In addition, the use of this preferred embodiment serves a safety function. As is seen, flow restrictor 300 fits into a replacement for plug 76 of FIG. 10, namely a hose connection 76', configured similarly to part 87. Connection 76' would be connected to the raising side of the cylinder to lift the guide arm into the up position. The orifice restrictor 300 serves to slow down the flow of oil to the cylinder thereby preventing the guide arm 18 from being raised in a hazardous fashion by being raised up too fast, whereby it could slam against the the tractor 10. It is seen therefore that the restrictor means 300 acts to dampen the speed of the raising of the arm 18, by reducing the flow of fluid to cylinder 97 from port 90 in the raising operation.

In other applications, the restrictor 300 can be employed on the valve body 17 such as to dampen the movement of a disengaging member when the valve 17 is intended to be taken out of service; for example to divert food in process from a color or size sorting system.

As per FIGS. 1, 2, & 19 guide arm 18 is directly connected to the valve body 17, whereby any movement from side to side of 16 has a bearing on the movement of the valve. The longer the arm 18 the less movement will take place in the valve body 17 from the predetermined corresponding movement of guide means 16. Conversely, if 18 were to be shortened valve 17 would become more sensitive to the same degree of lateral movement of 16, thus moving the rotation of valve 17 a greater degree.

An advantage of making guide arm 18 in two or more parts would be that during operation of harvest or when a guidance system would not be employed, but is still attached to the tractor, that portion of arm 18 would be in the line of sight of the driver when in the raised position, could be removed, thereby enhancing the view of the driver. Thus it is seen that in order to achieve an alterable length of guide arm 18 for the reasons aforesaid, any conventional mechanical hook up can be employed. For instance, 18 can be composed of two or more telescoping members that extend or contract to a minimum distance—said minimum being the attachment point of chain 25 to said guide arm. In addition, 18 could be manufactured as a plurality of threaded members that can be secured one to the other, male to female, as well as by using a constricted male portion to engage a wider female portion with a pin to be interposed through suitably aligned apertures such as a cotter pin, not shown in the figures, to rigidly engage one portion to the other. It is also to be seen that arm 18 may be constructed of two portions hingedly secured one to the other. Obviously, no part of 18 may be permitted to rotate with respect to any other part of 18 during operation of the guidance system.

Guide arm 18 is raised or lowered by operation of the cylinder 97, mounted on member 21 and which is hydraulically connected to bracket 24, such that the elevation of bracket 24, raises chain 25, in turn raising guide arm 18, (FIG. 1).

The use of the valve of the instant invention is seen to have applicability in the food processing industry, wherein separation by the control of size or color can be coordinated by the shuttling of off-size or off-color items to one side after a visual or electronic inspection of same.

The valve can also be used as a hydraulic control valve for a series of self-propelled sprinkler towers wherein it is desired to maintain the movement of the sprinklers in the same radius as each sprinkler rotates in its own circular orbit.

It is seen that the instant guidance system can be suitably modified for guiding farm equipment other than tractors. Thus for cultivators, which are propelled by tractors, into position over several rows of a row crop, the movement of steerable culters or wheels can be adapted to be controlled by the guidance system of this invention, in order to position the cultivator in relation to the crop row as per a predetermined furrow or bed somewhat independent of the positioning of the tractor to said predetermined furrow or bed.

Whether employed in connection with the guidance system of this invention or for some other purpose, it is readily recognized that the valve means 7 may be mounted top side, 52 up as shown in FIG. 10, or it may be inverted, such as is depicted in its use with a guidance system as per FIG. 1, wherein linking arm 136 can be seen to be beneath the valve means, 17.

It is readily recognized that the guidance system of this invention in one that tightly controls the steering mechanism of the vehicle, and that the system is capable of creating an immediate response capability in the steering mechanism when utilized therewith.

One of the major benefits to the operator or farmer who employs the instant guidance system in his fields is that he or she will avoid areas that are untilled, unwatered, unfertilized, etc., due to the fact that one or more passes of the tractor or machinery did not correspond to the alignment set by the immediately previous pass of the tractor.

It is envisioned by the inventor that the guidance system of this invention can be suitably modified, and used in conjunction with additional hardware and fittings to provide guidance means for such such heavy equipment as cultivators.

Since certain changes may be made in the above apparatus without departing from the scope of the invention herein involved, it is intended that all matter contained in the above description and shown in the accompanying drawings shall be interpreted as illustrative and not in a limiting sense.

I claim:

1. In a guidance system for a tractor having a centerline and having forwardly disposed steerable wheels and a power steering mechanism for turning said wheels in either direction, furrow guide means coupled to the tractor engageable with a guide furrow in a field whereby changes in the guidance means effect changes in the steering mechanism of the tractor, the improvement which comprises:
   valve means rotatably mounted on the tractor about a vertical axis aligned with the centerline of the tractor, and being operatively connected to both said guide means and the power steering mechanism,
   said valve means having a rotational control action valve therein, and said valve means also having means therein connected both to a source of hydraulic fluid on the tractor, and also connected to the power steering mechanism to selectively supply fluid from said source to said power steering mechanism through said control action valve and back to said source, upon rotation of said rotational control action valve in response to movement of said guide means, and means to prevent oversteer and understeer of said tractor relative to the movement of said guide means, connected both to said control action valve and to the steerable wheels of said tractor,
   said guide means including a guide arm normally extending coincident with the centerline of said axis operatively connected to said valve means on one end and having furrow guides at the distal end thereof.

2. In the guidance system of claim 1 wherein said furrow guides are a pair of discs having an axis of rotation parallel to the ground and being mounted at the distal end of said guide arm and extending laterally on each side thereof, each of said discs being rotatably mounted about their axis of rotation.

3. In the guidance system of claim 2 wherein said discs are laterally adjustable with respect to said guide arm.

4. In the guidance system of claim 3 wherein said guide discs are concave on one side and convex on the other, and are mounted angularly to the tractor centerline to converge downwardly and inwardly.

5. In the guidance system of claim 1 including lifting means controllable from said tractor and operatively coupled both to said valve means and to said arm for vertically lifting the arm and further including means responsive to the lifting for isolating the guidance system from the operation of the steering mechanism of the tractor.

6. In the guidance system of claim 5 wherein the means for isolating includes means for disengaging the valve means from the power steering system during periods of operator steering of the tractor, said disengaging means comprising valves disposed within the valve means and communicating with the means for lifting said arm to block flow of fluid through the valve means when the guide arm is lifted.

7. In the guidance system of claim 5 wherein the lifting means controllable from said tractor operatively coupled to said guide arm for vertically lifting the same is tractor mounted.

8. In the guidance system of claim 5, further including a means to dampen the speed of the raising of the guide arm.

9. In the guidance system of claim 1 wherein the means to prevent oversteer and understeer of said tractor relative to the movement of said guide means is a feedback sensing mechanism comprising means pivotally connected from the rotational control action valve to the wheels of said tractor whereby movement of the tractor wheels causes movement of the valve in an amount proportional to the movement of the wheels and in the direction of the movement of the wheels upon the movement of the wheels.

10. In the guidance system of claim 9 wherein the feedback sensing mechanism comprises an arm on the rotational control action valve pivotally connected by a link to a connecting arm, which connecting arm is pivotally connected to a wheel spindle.

11. In the guidance system of claim 10 wherein the length of said arm is substantially equal to the length of the connecting arm.

12. In the guidance system of claim 1 wherein said furrow guides are a pair of discs, and wherein said guide arm is rigidly secured at the distal end thereof to the centerpoint of a vertically depending inverted U-shape frame having a pair of spaced apart in the same horizontal plane members secured one per leg to the extremities of each of the legs of said frame, and each of said members extending inwardly from the extremity of its respective leg; said discs being secured at the inner end of each of said members, one disc per member said discs being angularly disposed to diverge outwardly.

13. In the guidance system of claim 12 wherein the guide discs are concave on one side and convex on the other and are mounted on said inwardly extending members with the concave side of said discs each facing its inwardly extending member.

14. In the guidance system of claim 1, wherein the valve means in addition to including port means, comprises a block and spool.

15. In the guidance system of claim 1 wherein the guide arm is connected to said valve means in a plane substantially perpendicular to the vertical axis of the valve.

16. In the guidance system of claim 15 wherein the means for preventing oversteer and understeer is a feedback sensing means operatively connecting said valve means to the tractor steering wheels to prevent oversteer and understeer of the tractor with respect to the movement of the guide arm.

17. In the guidance system of claim 1 wherein said valve means includes an orifice valve disposed therein to control the flow of fluid to the desired steering mode selected from left or right upon rotation of the rotational action valve.

18. In the guidance system of claim 17 wherein said valve means further including port means wherein said port means includes a pair of fluid ports leading to said source and in fluid communication therewith and a pair of fluid ports leading to said power steering mechanism and in fluid communication therein, all of said fluid ports being fluidly connected via passages through said valve means, said valve controlling the flow of fluid through said passages in response to rotation of said valve and selective fluid communication via said ports in said valve to said passages.

* * * * *